United States Patent [19]
Grimm et al.

[11] Patent Number: 5,958,497
[45] Date of Patent: Sep. 28, 1999

[54] CHICORY EXTRACT POWDER PRODUCTS AND EXTRACT PRODUCTION PROCESSES AND APPARATUS

[75] Inventors: Rudi Grimm, Erdmannhausen; Karl Loehmar, Korntal, both of Germany

[73] Assignee: Nestec S.A., Vevey, Switzerland

[21] Appl. No.: 08/875,833

[22] PCT Filed: Feb. 6, 1996

[86] PCT No.: PCT/CH96/00046

§ 371 Date: Aug. 6, 1997

§ 102(e) Date: Aug. 6, 1997

[87] PCT Pub. No.: WO96/24256

PCT Pub. Date: Aug. 15, 1996

[30] Foreign Application Priority Data

Feb. 8, 1995 [EP] European Pat. Off. .............. 95101653

[51] Int. Cl.$^6$ ................ A23B 4/03; A23F 5/00; A23L 1/28; A23C 3/02
[52] U.S. Cl. ............ 426/596; 426/466; 426/594; 426/595; 426/425; 426/489; 99/483
[58] Field of Search .................. 426/596, 466, 426/594, 595, 425, 489; 99/483

[56] References Cited

U.S. PATENT DOCUMENTS 4,154,864 5/1979 Risler et al. ............................ 426/448

FOREIGN PATENT DOCUMENTS 9410852 5/1994 WIPO .

OTHER PUBLICATIONS

Database Abstract. AN:92–174141 [21] WPI/DERWENT for SU1658969. Inventors: Bulii et al., Jun. 1991.

Database Abstract. AN 77(09):H1567 FSTA for French Patent Application 2,302,043. Inventor: Lefebvre. 1976.

Primary Examiner—Anthony J. Weier
Attorney, Agent, or Firm—Vogt & O'Donnell, LLP

[57] ABSTRACT

A water-soluble carmelized chicory product has a composition which includes, by weight, an inulin content between 40% and 65%, a reducing sugar content between 4% and 10% and a combination of fructose and glucose of less than 5% and which provides a depth of color, as described below, between 1.0 and 2.5. The product is prepared by extracting kiln-dried chicory with water to obtain an extract or by pressing chicory root to obtain an extract, the extract is heated in a tubular extractor to hydrolyze a part of the extract inulin content to increase extract reducing sugar content, the heat-treated extract is dried to obtain a powder, the powder is passed through an extruder and subjected to a temperature between 180° C. and 250° C. to obtain a caramelized product, and the carmelized product is cooled and then ground to obtain the water-soluble chicory product. Apparatus for preparing the product and for carrying out the process includes an assembly including devices for effecting water extraction or pressing to obtain a chicory extract, a tube system for heating the extract, a drier device, an extruder for receiving powder from the drying device for the extrusion and heating operations, a cooled belt for cooling the caramelized product and a grinding device for obtaining a ground caramelized product.

25 Claims, 4 Drawing Sheets

CHICORY EXTRACT POWDER PRODUCTS AND EXTRACT PRODUCTION PROCESSES AND APPARATUS

This application has been filed under 35 USC 371 as a national stage application of PCT/CH96/00046 filed Feb. 6, 1996.

BACKGROUND OF THE INVENTION

The present invention relates to water-soluble chicory powder products and to processes and apparatus for producing such products.

The conventional processing of chicory comprises process steps of roasting, extraction and drying. The disadvantages of this processing are, on one hand, unevenness of the colour of the roast material and risk of burning chicory pieces and on the other hand, the hygroscopicity of the extract powders, and thus, water-soluble chicory powders currently on the market are not satisfactory with respect to sensory properties and because of excessive hygroscopicity.

In the conventional processing, the roasting is a process which is difficult to direct. The thermal decomposition of the carbohydrate, the pyrolysis of chicory inulin, proceeds exothermically. In the roaster, smaller chicory pieces are roasted more rapidly, and are therefore darker than the larger pieces, or are sometimes burnt. Larger chicory pieces are darker in the core than on the exterior. This uneven roasting has a disadvantageous effect on the flavour of the chicory extract. In addition, during the roasting and the extraction, the chicory inulin is cleaved to form fructose and glucose. The inulin cleavage must be kept within certain limits, so that the extract obtained is not excessively hygroscopic. Further, in order to be able to dry roast chicory extracts at all, in the spray-drying, the outlet air moisture, and thus the capacity of the towers, must be decreased. During the course of a relatively long operating time, encrustations occur in the tower which lead also to losses of material.

SUMMARY OF THE INVENTION

The object underlying the invention is to find a water-soluble chicory powder which has good sensory properties and decreased hygroscopicity.

The invention relates to a water-soluble caramelized chicory extract powder which contains between 40 and 65% of inulin, between 4 and 10% of reducing sugars, less than 5% of fructose and glucose, and which has a depth of colour between 1.0 and 2.5.

The present invention further provides processes for producing the chicory extract powder of the invention wherein kiln-dried chicory is extracted with water to obtain an extract or chicory root is pressed to obtain an extract, the extract is dried to form a powder, and the powder is caramelized in an extruder between 180° C. and 250° C. at residence times of up to 5 minutes to a depth of colour between 1.0 and 2.5, and then the product obtained from the extruder is cooled and ground. The throughput of chicory powder through the extruder is a function of its size.

The present invention also provides a product for preparation of a beverage wherein the chicory powder described above is combined with instant roasted round coffee and/or instant roasted ground coffee substitute wherein the content of the instant coffee or coffee substitute is from 5% to 95%, and it is also possible to extract chicory to combine a mixture of the green extract powder with instant roasted coffee and/or instant roasted coffee substitute and caramelize the mixture in the extruder, wherein the content of instant roasted coffee or instant roasted coffee substitute in the mixture is between 5 and 95%.

The present invention further provides apparatus for carrying out the process comprising an extractor (diffuser) for extraction to obtain an extract or a mill, steam coil and press for extraction to obtain an extract, and comprising a separator to obtain liquid extract from undissolved solids, a tube system with means for heating the liquid extract, means for drying the extract to obtain a powder, extruder means for caramelization, a cooling belt, and means for grinding cararmelized product, and wherein the extractor, separator, tube system and drying means are connected by piping, or tubing, and the extruder means may be a double-screw extruder and may be fed by a screw feeder.

DETAILED DESCRIPTION OF THE INVENTION

As reserve carbohydrate, chicory contains inulin, which is made up of the monosaccharides fructose and glucose. The polysaccharide inulin has no reducing end groups and therefore does not have any reducing capacity. In the present invention in the extraction step, the the inulin is dissolved out of the chicory and then cleaved at elevated temperatures to form oligo- and disaccharides, down to fructose and glucose. This increases the reducing capacity, which is greatest for the monosaccharides.

Determination of the reducing sugars is based on the reducing capacity of the saccharides and increases to the extent that the average molecular mass of the saccharides decreases. Fructose and glucose are determined directly enzymatically, inulin enzymatically following acid hydrolysis. The depth of colour is the absorbance measured due to a 1% strength aqueous solution of the chicory powder in a cuvette of 1 cm path length using light of wavelength 500 nm.

If the reducing sugar content in chicory powder before the caramelization is below 4%, i.e. in unhydrolysed extracts, the caramelized powder produced has a sharp harsh flavour. If the reducing sugar content in chicory powders before the caramelization is between 5 and 8%, i.e. in partially hydrolysed extracts, the powder has a mild pleasant flavour. The hygroscopicity of the extract powder increases with the hydrolytic cleavage of the inulin. The inulin cleavage must only be carried out to the extent that the powders may be dried without difficulty and have sufficient stability for the intended product application. An inulin content between 40 and 65% leads to a decreased powder hygroscopicity.

By means of the powder according to the invention, the proportion of the powder in formulas can be made higher. Up to 50% chicory powder may be used, e.g. in a mixture with coffee extract. Preference is given to a water-soluble chicory powder which contains between 50 and 65% of inulin, between 6 and 9% of reducing sugars and less than 4% of fructose and glucose and which has a depth of colour between 1.2 and 1.8. If a mixture with coffee extract is taken as a starting point, this extract can be either a standard instant roasted coffee, which is mixed or agglomerated together with the powder according to the invention, or a standard instant roasted coffee in the liquid state, which is mixed, dried or agglomerated.

Further with reference to the conventional process noted above, our process operates the other way round, i.e. we firstly extract the kiln-dried material or press the root material, dry the extract obtained and thereupon caramelize the chicory powder in an extruder.

Kiln-dried chicory can be used in the form of slices, cubes or grits. Slices, cubes or grits are taken to mean chicory pieces of width 20 to 40 mm, thickness 5 to 7 mm and variable length, edge length 12 to 25 mm, or a sieved fine fraction of >2 to <10 mm, respectively. Because of the smaller cut size, the extraction yield with grits is greater than with cubes and slices. By means of the extruder processing, a degree of caramelization of chicory powders is obtained which can be set precisely over a broad range and is characterized by a high uniformity in the colour of the caramelized powder. A double-screw extruder is used for the caramelization.

The kiln-dried chicory (about 90% dry matter) is extracted in an extractor equipped with a plurality of diffusers in which the chicory is situated. The water for extraction is heated to 80–90° C. and flows through these diffusers, and the liquid extract then passes to a separator in which the undissolved solids are separated off. The diffuser residue is discarded. The liquid extract is subjected to a reheating at 110–130° C. in a tubular extractor, in order to achieve partial hydrolysis of the inulin. On exit from the tubular system, the extract has a temperature between 60 and 80° C. The liquid extract is then dried conventionally in a spray tower using hot air.

As also set forth above, another processing method is to separate off extracted substances by pressing fresh chicory roots (about 26% dry matter). The washed chicory roots are finely shredded, heated to temperatures of 60 to 70° C. in a steam coil and pressed in a press. As described above, the press extract obtained is then reheated at temperatures of 110–130° C. in a tubular extractor. This thermal treatment achieves partial hydrolysis of the inulin and the extract viscosity is substantially decreased. The liquid extracts are therefore separated downstream of the hydrolysis. Finally, the liquid extracts are concentrated from about 20% to 40% dry matter and spray-dried.

The green powder has a reducing sugar content in the range from 5 to 8%, in order that the powder is easier to caramelize than unhydrolysed powder. The temperature profile during caramelization must be below 250° C., since otherwise turbidities are formed to an increased extent which adversely affect the flavour of the chicory powder. The caramelization is preferably performed at between 200 and 240° C. and at residence times of up to 2 minutes. The throughput of chicory powder through the extruder is set so that the desired depth of colour is achieved.

Additionally, a process similar to that used for chicory can also be used for coffee. Green coffee is extracted and the soluble powder is caramelized in an extruder. The two caramelized powders of chicory and coffee obtained are then mixed in a desired ratio.

A further solution is that coffee and chicory are extracted separately and the two green powders are mixed and caramelized together in the extruder.

For these two last-mentioned solutions, a coffee content between 5 and 95% can be selected and a chicory content between 5 and 95% can be selected.

The apparatus of the present invention is described below in more detail in association with the accompanying drawing Figures.

BRIEF DESCRIPTION OF THE DRAWING FIGURES

DETAILED DESCRIPTION OF THE DRAWING FIGURES AND OF APPARATUS OPERATION

Figure 1:
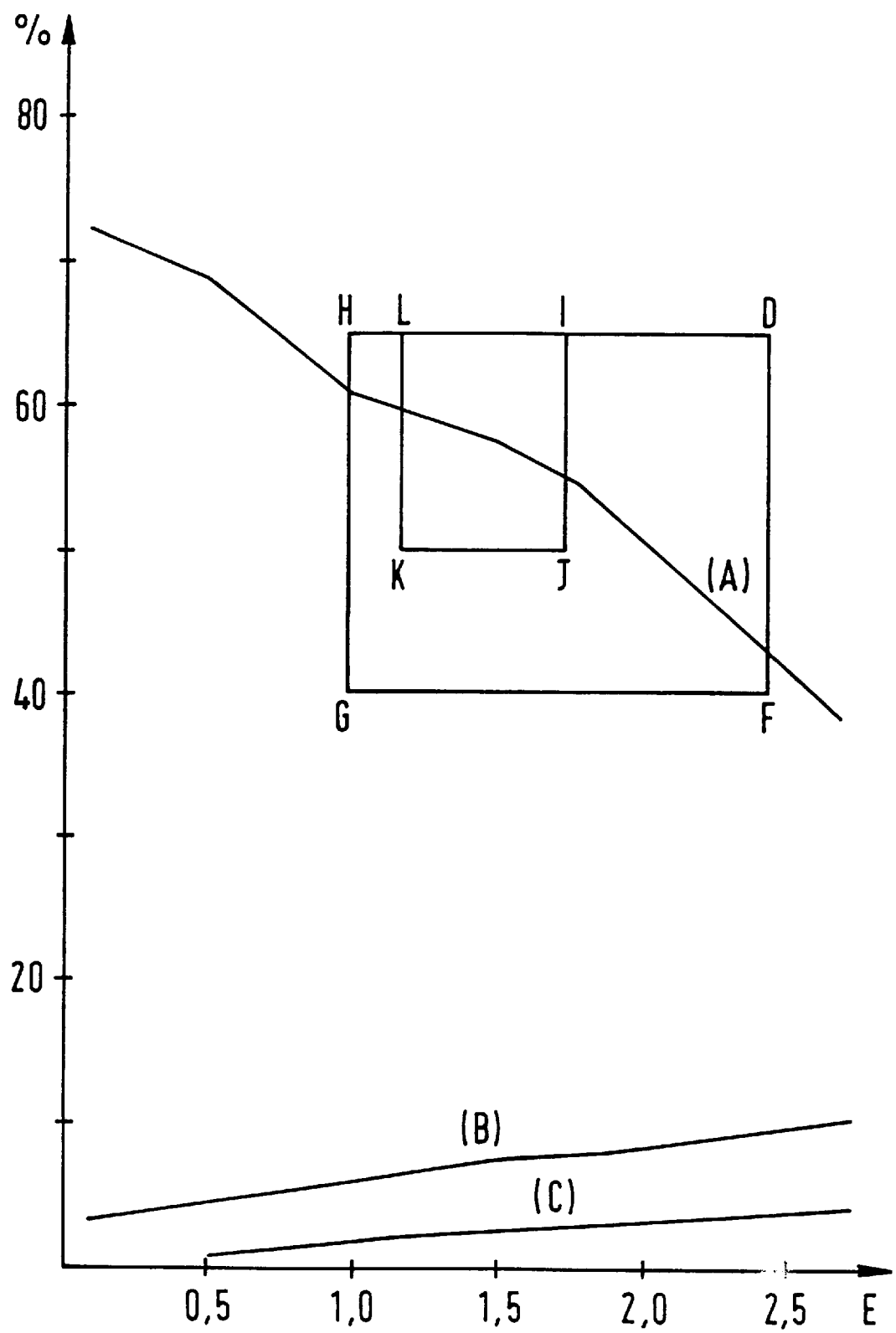
FIG. 1 shows the lines of the variation of the contents of inulin, reducing sugars and the sum of fructose and glucose.

In FIG. 1, the lines (A), (B) and (C) show the variation in the content of inulin, reducing sugars and fructose plus glucose, respectively, in the caramelized chicory powder as a function of the depth of colour E. As already mentioned above, the depth of colour is the absorbance of light of wavelength 500 nm measured in a 1% strength aqueous solution of the chicory powder in a cuvette of 1 cm path length.

We claim the chicory powder having properties in the range DFGH, preferably in the range IJKL, as regards inulin, reducing sugars, the sum of fructose and glucose, and the corresponding depth of colour.

Figure 2:
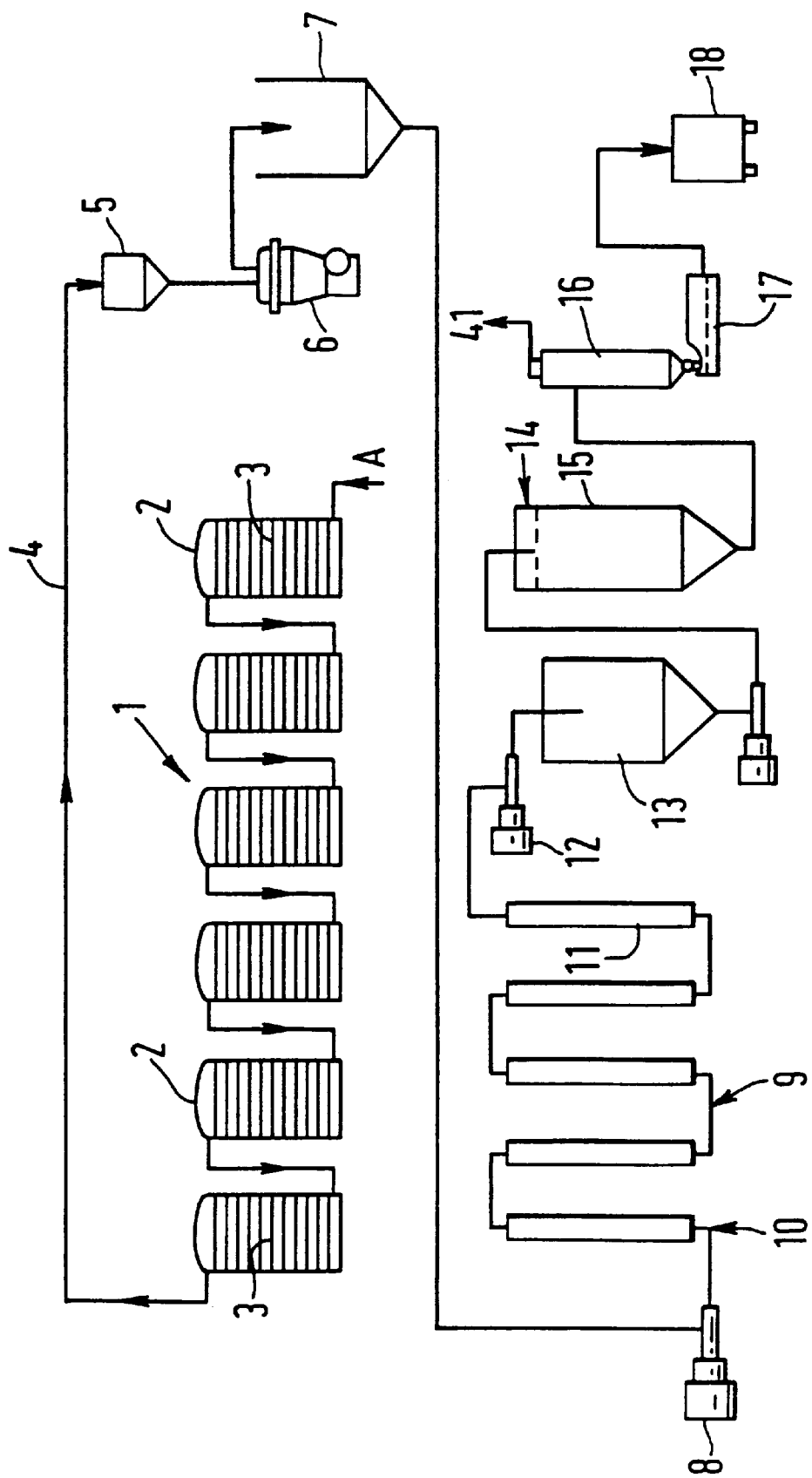
FIGS. 2 and 3 show two diagrammatic representations of the apparatus according to the invention upstream of the caramelization.

The apparatus illustrated in FIG. 2 includes to an extractor (1) which comprises 6 diffusers (2). Each diffuser is charged with chicory slices, cubes or grits (3). Hot water at approximately 90° C. flows in accordance with arrow A. The effluent extract flows through the tube (4) for deaeration in an overflow vessel (5) and then into the separator (6), where the insoluble solids are centrifuged off. The pump (8) transports the liquid extract from the intermediate storage vessel (7) to the tubular reactor (9) in which a pressure of approximately 5 bar prevails. The extract is heated to approximately 115–120° C. by means of steam (10) on entry into the tubular reactor. The liquid extract flows through the first four tubes and, after a residence time of 20 to 25 minutes, is cooled to approximately 85° C. in the tubular cooler (11). The liquid extract passes via the pump (12) into a further intermediate storage vessel (13), is then atomized in a tower (15) and dried in a hot-air stream (14). The powder is separated from the entrained air in the separator (16), further cooled in the aftercooler (17) and collected in containers (18) for the caramelization.

Figure 3:
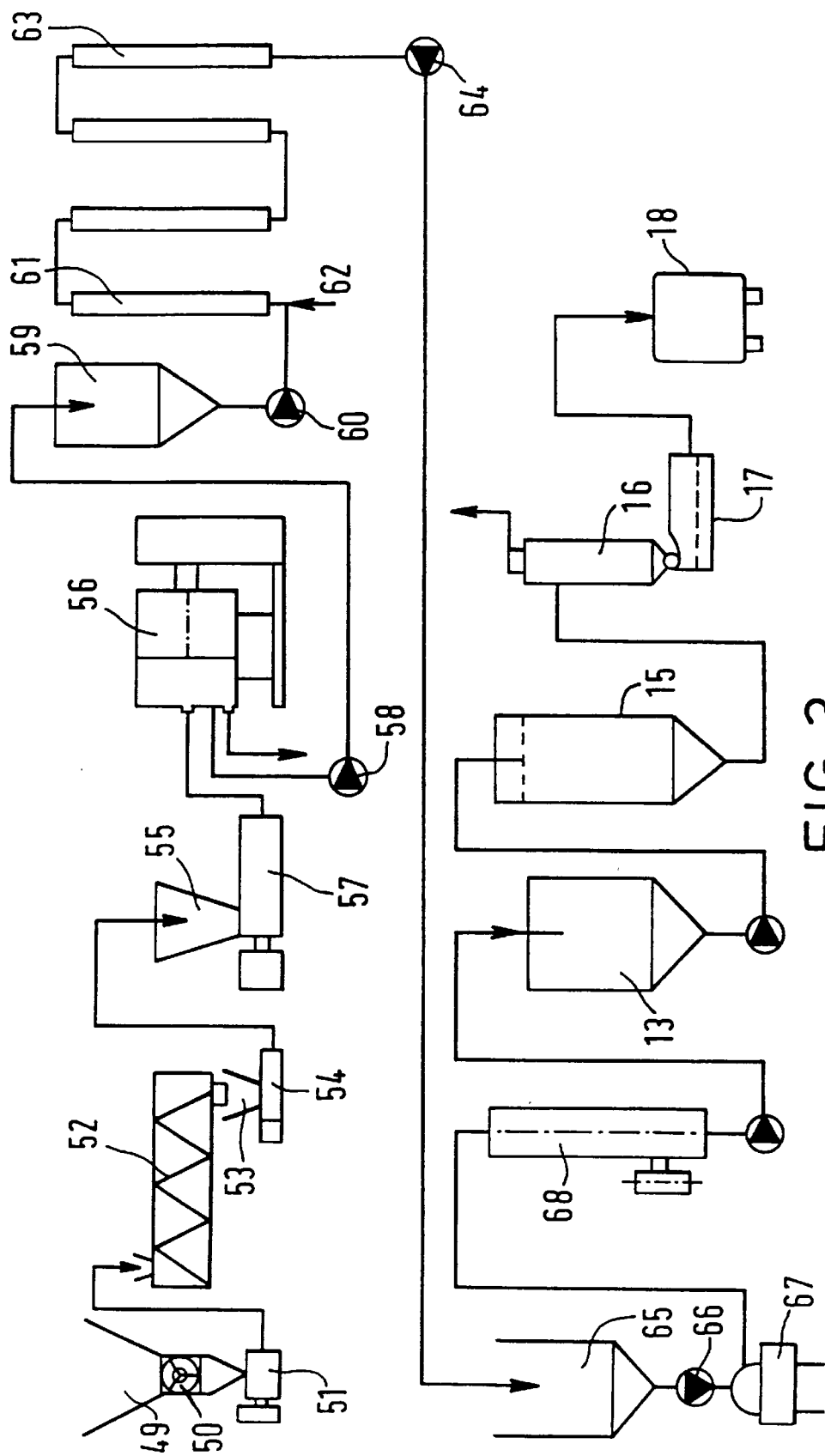

The apparatus illustrated in FIG. 3 includes to a storage vessel (49) and a mill (50) for chopping the washed chicory roots. The chopped material is transported by a Mohno pump (51) into the steam coil (52) and heated to 60–70° C. with direct steam. At the end of the steam coil, the chopped chicory material falls into the intake hopper (53) of a further Mohno pump (54) and is collected in a storage vessel (55). The hydraulic piston press (56) is charged batchwise by a pump (57) and the effluent press extract is transported by a pump (58) to a vessel (59). From there, the liquid extract passes by means of a pump (60) into the tubular reactor (61), is heated to 130° C. by direct steam (62) and, after a residence time of 10 min, is cooled to 85° C. in the tubular cooler (63), and the liquid extract passes via the pump (64) to a further storage vessel (65). To remove the turbidities, the liquid extract runs via a further pump (66) and the separator (67) and is concentrated from about 20% dry matter to 35–40% dry matter in the evaporator (68). The liquid extract is then spray-dried (cf. FIG. 2) as already described above from the vessel (13).

Figure 4:
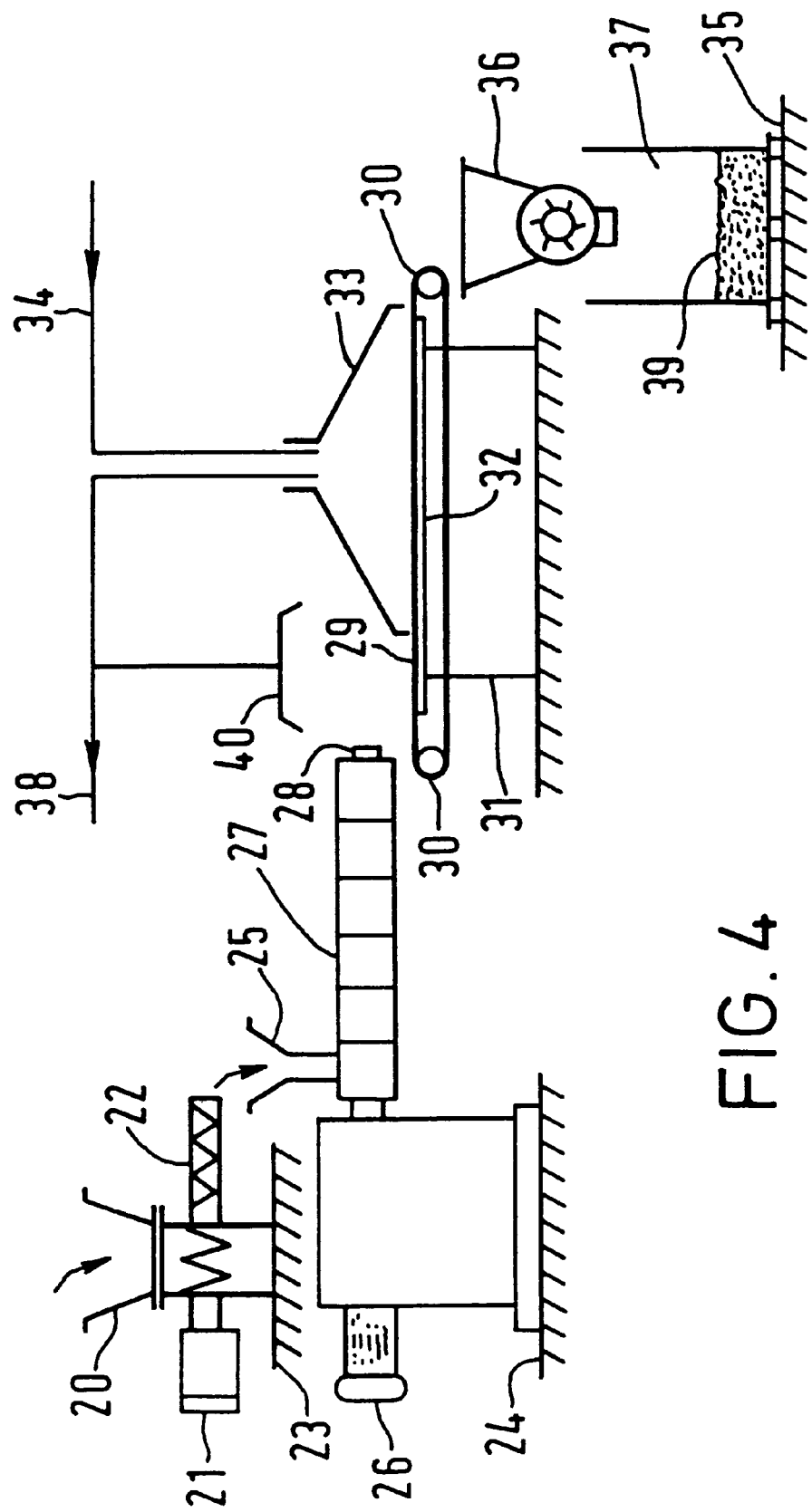
FIG. 4 shows a diagrammatic representation of the caramelization of the green chicory powder.

The chicory powder is transported from the hopper (20) to the caramelization extruder (27) illustrated in FIG. 4 via a screw feeder (22) which is driven by means of a motor (21). The feeder (22) stands on a base (23) and the extruder (27) and its motor (26) stand below on a base (24).

From the feeder (22), the powder passes by means of a hopper (25) into the first segment of the extruder (27). A double-screw extruder is used having 6 or more segments and which is driven by a motor (26). The segments 3 to 6, or inclusive of all other segments, are heated to temperatures of approximately 200° C. by external heaters and circulating thermal oil (not shown). Built-in kneading elements (on the left portion of the extruder of the FIG. 4 drawing) plasticize the chicory powder between the first and third segments. In the hot-holding zone, the internal pressure increases owing to the formation of carbon dioxide. A caramelized extract of homogeneous appearance without white specks is obtained.

After flowing through the dies (28), the hot viscous chicory extract falls onto a belt (29) which runs between two rollers (30). The belt stands on the base (24) by means of frame (31) and is equipped with cooling chambers (32) through which brine flows at 15° C. The extract is pressed out to form a thin layer by a rotating roller lying on top of the belt and is cooled, so that uneven post-caramelization is prevented. The chicory extract is further cooled from the top (33) with forced air from a blower (34). The caramelized product is removed at the end of the belt (29) and ground by a comminuter (36). The gases formed during the caramelization are removed by suction above the belt through line (38). The powder (39) falls into the vessel (37) which stands on the base (35).

At a constant temperature profile of the extruder segments, the degree of caramelization of the chicory extract is dependent on the throughput rate. A darker chicory powder is obtained at low throughputs and a lighter powder is obtained at higher throughputs.

In the caramelization of unhydrolysed chicory powders (less than 4% reducing sugars), especially at higher depths of colour, turbidities are formed to a greater extent, which cause an astringent and sharp taste of these extracts and lead to coating in the mouth. In contrast, the caramelized extracts made from partially hydrolysed chicory powders (between 5 and 8% reducing sugars) have a mild and pleasant taste, and in addition, they contain turbidities to a lesser extent.

The chicory powder according to the invention has good sensory properties, a lower hygroscopicity and good uniformity of the brown colour. Therefore, higher proportions of the soluble chicory powder can be used in formulas, and the finished products produced have an improved stability during storage and after opening.

Identified below are the literature references which describe the analytical methods which have been used to analyse the chicory powders. The reducing sugars were determined by complexometry by the method of Potterat-Eschmann. The content of reducing sugars indicates the total of all reducing end groups of the inulin saccharides calculated as g of fructose per 100 g of dry matter. This method is given in the Handbuch der Lebensmittelchemie [Food chemistry handbook] II/2, 352 (1967) and in the Schweizerischen Lebensmittelbuch [Swiss Food Codex], Volume 1, page 562 (1964). Fructose and glucose were determined enzymatically in the chicory extract powders, the procedure is described in "Methoden der biochemischen Analytik und Lebensmittelanalytik" [Methods in biochemical analysis and food analysis], published by the Boehringer Mannheim company.

The inulin in the extract powders was hydrolysed by 0.5% strength hydrochloric acid in a boiling water bath for a period of 20 minutes (cf. K. Täufel et al.; Nahrung 3, 701, 1959). The inulin content was calculated from the fructose and glucose contents before and after hydrolysis by multiplying the difference, the content of hydrolysed sugars, by the factor 0.9.

EXAMPLES

Working examples for preparing the chicory powder are described below, all percentages being by weight. The methods for the analytical study of the chicory powders are presented as well.

Example 1

An extractor having six diffusers is employed. Each diffuser contains 120 kg of kiln-dried chicory grits. The extraction temperature is 90° C., with a cycle time of 30 min, the effluent volume being 360 liters. The effluent extract has a dry matter content of 20% and the extraction yield is approximately 65%.

In the tube system, the residence time of the extract is 22 min, at a gauge pressure of 5 atmospheres with a flow rate of 800 l/h. The temperature of the liquid extract is 118° C. at the inlet and 85° C. downstream of the cooler. The liquid extract has a dry matter content of 18.4%.

Spray-drying is then performed in a standard manner with an inlet air temperature of 265° C. 120 kg of kiln-dried chicory grits having a dry matter content of about 90% produces, on average, 70 kg of green chicory powder.

A double-screw extruder is used for the caramelization. The temperature of the segments 3 to 6 is 200° C. and the throughput of the powder is between 50 and 60 kg/hour at a depth of colour of 1.21. The residence time in the extruder is approximately 30 seconds. The brine temperature below the belt (29) is 15° C. and the belt runs at a speed of 5 m/sec. The cooled caramelized chicory powder is comminuted to a particle size of <2.0 mm.

120 kg of kiln-dried chicory at the beginning then produces, on average, 65 kg of caramelized chicory powder having a content of inulin of 62.3%, of reducing sugars of 7.4%, and of fructose plus glucose of 2.1%.

Example 2

The chicory roots were grated in a mill and the chopped material was heated in a steam coil to temperatures of 60–70° C. by direct heating with steam at throughputs of 300 kg/hour.

The hydraulic oil-pressure press was charged batchwise with chopped chicory material. About 2 hours were required to charge the press, and 1 hour for the actual pressing. The pressure at the end of the pressing operation was 200 bar. 500 kg of pressed extract having a dry matter content of 20.1% and 148 kg of pressing residue having a dry matter content of 37.8% were obtained. The extract yield was 64.3%.

In a tubular system, the pressed extract was post-treated at a temperature of 130° C. and at a pressure of 5 bar. At a throughput of 600 kg/hour, the residence time of the extract was 10 min.

After the separation, the liquid extract was concentrated from a dry matter content of 20.1% to a dry matter content of 36.5% and was then spray-dried.

The extract powder was caramelized as described under Example 1.

The analysis of the chicory powder includes the following methods of determination:

Dry matter

About 2 g of powder are weighed accurately into a dried nickel dish and dried for 2 hours at 85° C. in a drying cabinet. After the sample is cooled in a desiccator, the sample is reweighed.

$$\% \text{ DM} = \frac{\text{Final weight} \times 100}{\text{Initial weight}}$$

Depth of colour 1.0 g of powder, based on DM, are weighed into a 250 ml glass beaker and made up to 100 g with distilled water. The total weight of glass beaker, glass rod, sample and water is determined and the powder is dissolved by stirring. The sample solution is heated to about 70° C., then cooled down again in a cold water bath and made up to the initial weight with water. To measure the depth of colour, the solution is diluted by 1:5 (e.g. 20 ml to 100 ml), the dilute solution is centrifuged and the absorbance of the clear solution is measured at 500 nm in 1 cm cuvettes.

Reducing sugars

About 3 g of sample material are weighed into a 150 ml glass beaker to an accuracy of ±1 mg, together with 1 g of calcium carbonate. The total weight of glass beaker and glass rod is determined (G). After addition of 70 ml of water, the suspension is allowed to stand for 30 minutes at 60° C. in a thermostat. The weight is made up to a volume of 100 ml by addition of water (G+100 g). The solution is filtered through a fluted filter and 10 ml of filtrate are used for the Potterat-Eschmann sugar determination.

$$\% \text{ reducing sugars in DM} = \frac{\text{mg of sugar from consumption} \times 100}{\text{g initial sample weight} \times \% \text{ DM}}$$

Fructose and glucose

The solution used for determining the reducing sugars is diluted by 1:2 and 0.1 ml of the dilute solution are used for the enzymatic test.

$$\% \text{ free Fru or Glu in DM} = \frac{\text{g/l} \times 100 \times 100}{\text{g initial sample weight} \times 5 \times \% \text{ DM}}$$

Inulin

About 1.5 g of sample material are weighed into a 100 ml volumetric flask to an accuracy of ±1 mg and heated with 75 ml of 0.5% strength hydrochloric acid for 15 min in boiling water. After the solution is cooled, 5 drops of 0.5% strength bromothymol blue solution in ethanol and 2 N sodium hydroxide solution are added until the indicator changes colour (about 4.5 ml are needed for this, if necessary check using pH paper). After addition of 2 ml of saturated lead acetate solution, the volumetric flask is made up to the mark and shaken. The solution is filtered through a fluted filter.

20 ml of 2% strength sodium oxalate solution are placed in a 100 ml volumetric flask and 25 ml of clear filtrate are pipetted in. After shaking the volumetric flask and making it up with water, the solution is filtered through a fluted filter. 20 ml of the clarified solution are diluted to 100 ml for the enzymatic determinations.

$$\% \text{ total Fru or Glu in DM} = \frac{\text{g/l} \times 20{,}000}{\text{g initial sample weight} \times \% \text{ DM}}$$

$$\% \text{ insulin} = 0.9 \, (\% \text{ total Glu} + \text{Fru} - \% \text{ free Glu} + \text{Fru})$$

We claim:

1. A process for preparing a water-soluble chicory product comprising:
    obtaining an extract from chicory by an extraction method selected from the group consisting of extracting kiln-dried chicory with water and of pressing chicory root to obtain a chicory extract;
    heating the extract obtained in a tubular extractor to hydrolyze a part of the extract inulin content to increase extract reducing sugar content to obtain a heat-treated extract;
    drying the heat-treated extract to obtain a powder;
    passing the powder through an extruder for treating the powder for up to 5 minutes and heating the extruder to subject the powder passed through the extruder to a temperature between 180° C. and 250° C. to obtain a caramelized product from the extruder;
    cooling the caramelized product to obtain a cooled product; and
    grinding the cooled product to obtain a ground, water-soluble chicory product.

2. A process according to claim 1 wherein the extract is heated to hydrolyze the inulin so that the heat-treated extract has a reducing sugar content of at least 4% by weight.

3. A process according to claim 1 wherein the extract is heated to hydrolyze the inulin so that the heat-treated extract has a reducing sugar content of between 5% and 8% by weight.

4. A process according to claim 1 wherein the extract is heated to hydrolyze the inulin so that the heat-treated extract has an inulin content of between 40% and 65% by weight.

5. A process according to claim 1 wherein the extract is heated at a temperature of from 110° C. to 130° C.

6. A process according to claim 1 or 5 wherein the chicory is kiln-dried chicory and the water for extracting the kiln-dried chicory has a temperature of from 80° C. to 90° C.

7. A process according to claim 1 or 5 wherein the chicory is chicory root and the root is heated with steam at a temperature of from 60° C. to 70° C. and pressed for extracting the chicory.

8. A process according to claim 1 wherein the powder is passed through the extruder for up to 2 minutes and subjected to a temperature between 200° C. and 240° C.

9. A process according to claim 1 wherein the heat-treated extract is spray-dried for drying the extract.

10. A process according to claim 1 further comprising, prior to drying the heat-treated extract, cooling the heat-treated extract to a temperature between 60° C. and 80° C. and then drying the cooled, heat-treated extract.

11. A process according to claim 10 wherein the heat-treated extract is spray-dried for drying the extract.

12. A process for preparing a product for preparation of a beverage comprising:
    obtaining an extract from chicory by an extraction method selected from the group consisting of extracting kiln-dried chicory with water and of pressing chicory root to obtain a chicory extract;
    heating the extract obtained in a tubular extractor to hydrolyze a part of the extract inulin content to increase extract reducing sugar content to obtain a heat-treated extract;

drying the heat-treated extract to obtain a powder;

passing the powder and an instant coffee through an extruder for treating the powder and instant coffee for up to 5 minutes and heating the extruder to subject the powder passed through the extruder to a temperature between 180° C. and 250° C. to obtain a caramelized product from the extruder;

cooling the caramelized product to obtain a cooled product; and grinding the cooled product to obtain a ground, water-soluble product.

13. A process according to claim 12 wherein the instant coffee passed through the extruder is, based upon the weight of the powder and instant coffee, in amount between 5% and 95%.

14. The ground product of the process of claim 1.

15. The ground product of the process of claim 2 or 3.

16. The ground product of the process of claim 12.

17. A composition comprising a water-soluble caramelized chicory powder wherein, by weight, the chicory powder comprises inulin in an amount between 40% and 65%, reducing sugars in an amount between 4% and 10% and a combination of fructose and glucose in an amount of less than 5% and wherein the powder has a depth of color between 1.0 and 2.5.

18. The composition according to claim 17 wherein the chicory powder comprises inulin in an amount between 50% and 60%, the reducing sugars in an amount between 6% and 9%, the combination of fructose and glucose in an amount of less than 4% and wherein the depth of color is between 1.2 and 1.8.

19. The composition according to claim 17 further comprising an instant coffee.

20. The composition according to claim 19 wherein the instant coffee is in an amount, by weight, between 5% and 95%.

21. Apparatus for preparing a water-soluble caramelized chicory powder comprising:

an extraction assembly for obtaining an extract from chicory selected from the group consisting of kiln-dried chicory and of chicory roots wherein when the chicory is kiln-dried chicory, the extraction assembly comprises a diffuser device for extracting the kiln-dried chicory with water and wherein when the chicory is roots, the extraction assembly comprises a mill and a steam coil and press assembly for milling the roots for chopping the roots and then for steaming and pressing chopped roots;

a separator for separating extract from undissolved solids;

a tube system for receiving the extract for passage therethrough and comprising means for heating the extract passed therethrough to obtain a heat-treated extract;

means for drying the heat-treated extract to obtain a powder;

means for extruding the powder and comprising means for heating the extruder to heat the powder to a temperature to caramelize the powder to obtain a caramelized product from the extruder;

a cooled belt for receiving the caramelized product from the extruder for cooling the caramelized product; and means for grinding the cooled caramelized product for obtaining a ground product.

22. Apparatus according to claim 21 further comprising a screw-feeder for feeding the powder to the extruder means.

23. Apparatus according to claim 21 or 22 wherein the extruder is a double-screw extruder.

24. Apparatus according to claim 21 further comprising a tubular cooler positioned in the apparatus assembly intermediate of the tube system and the drying means for receiving the heat-treated extract from the tube system for cooling the heat-treated extract.

25. Apparatus according to claim 21 wherein there are a plurality of diffusers.

* * * * *